United States Patent [19]

Reid, III

[11] 4,360,184

[45] Nov. 23, 1982

[54] PNEUMATIC DEVICE FOR ATTENUATION OF VERTICAL, HORIZONTAL AND ROTATIONAL DYNAMIC FORCES

[75] Inventor: Willis J. Reid, III, Maynard, Mass.

[73] Assignee: Technical Manufacturing Corporation, Woburn, Mass.

[21] Appl. No.: 122,131

[22] Filed: Feb. 19, 1980

[51] Int. Cl.³ .......................................... F16M 13/00
[52] U.S. Cl. .................................... 248/573; 248/583; 248/610; 248/619; 248/631
[58] Field of Search .............. 248/573, 580, 583, 610, 248/611, 613, 619, 621, 631; 267/121, 122, 124

[56] References Cited

U.S. PATENT DOCUMENTS

| | | | |
|---|---|---|---|
| 929,272 | 7/1909 | Baron | 248/583 |
| 2,770,434 | 11/1956 | McNally | 248/631 |
| 3,282,542 | 11/1966 | Goodwin et al. | 248/631 X |
| 3,627,246 | 12/1971 | Widding | 248/631 X |
| 3,788,587 | 1/1974 | Stemmler | 248/631 X |
| 3,949,961 | 4/1976 | Pamer | 248/613 |

FOREIGN PATENT DOCUMENTS

| | | | |
|---|---|---|---|
| 139908 | 1/1951 | Australia | 248/565 |
| 629690 | 3/1963 | Belgium | 248/611 |
| 2342370 | 2/1974 | Fed. Rep. of Germany | 267/121 |

Primary Examiner—William H. Schultz
Attorney, Agent, or Firm—Thompson, Birch, Gauthier & Samuels

[57] ABSTRACT

A pneumatic piston assembly wherein a first apertured piston having a piston well is secured by a diaphragm to a pneumatic chamber. A load-supporting element is received in and pivotally engages the floor of the piston well. The load to be isolated directly engages the load-supporting element. Vibrational forces acting on the chamber are primarily absorbed by the piston in a gimbal-like fashion, thereby effectively isolating the supported load from such forces.

8 Claims, 3 Drawing Figures

PNEUMATIC DEVICE FOR ATTENUATION OF VERTICAL, HORIZONTAL AND ROTATIONAL DYNAMIC FORCES

BACKGROUND OF THE INVENTION

This invention relates to a vibration isolation system.

Specifically, the invention is directed to a pneumatic vibration isolation device of the "air spring" type which attenuates the horizontal components of disturbing vibrations, while improving the vertical isolation properties of the pneumatic device.

All buildings vibrate and vibrations transmitted through the floor affect instruments and apparatus to varying degrees. A vibration isolation system must have a natural frequency (resonate) materially below the lowest floor frequency. High frequency (over 25 Hz) vibrations can easily be attenuated with traditional static control systems such as a marble slab supported on rubber pads, cork, fiberglass, or inflated bags. Serious problems usually occur when floors vibrate at low frequencies (7–25 Hz). Most static systems resonate in or above this frequency range and therefore, actually amplify low frequency vibrations. Traditional static systems designed for low frequency vibration problems are usually too massive or too unstable to be practical for most applications. Any static low frequency system is very sensitive to load variations which cause level changes in the top surface and obvious operator problems.

Air isolation systems are not static. Typically, they have an ultra-low natural frequency which provides a high degree of both attenuation and damping. Some systems, such as the MICRO-g System, as sold by Technical Manufacturing Corporation of Woburn, Mass., have automatic self-leveling that provides high stability and zero static deflection. Typically, these air isolation systems are available as self-contained tables, bench top units, etc. They are of the "air spring" type wherein the load carrying piston is pneumatically supported and secured with a flexing element. The systems are primarily used in laboratories for such instruments as microscopes, electronic balances, etc. and in industry, such as in the manufacture of micro-miniature circuits and related components.

The prior art most pertinent to the present invention makes use of two different types of flexing elements. Both are usually a fabric-reinforced rubber flexing element. The two differ largely in height, and can be made to effect differences in the available flexure in the horizontal direction.

The first application of the flexing device is commonly described as a diaphragm device. It is flexible in the vertical direction and less so horizontally. A flexible diaphragm sealing element is allowed to roll up and down between the walls of an outer restraining ring and the side of a load bearing piston. Versions of this diaphragm device are employed with varying height and width of the annular roll portion so as to effect varying desired amounts of horizontal flexure.

A device of this type does not have nearly as effective horizontal flexure as vertical flexure. The diaphragm system has the virtues of compactness in the vertical sense and security against unwanted sway in the horizontal sense. In the typical application of the art, such a diaphragm is thin (0.010–0.025 inch) and therefore, rather easily flexed.

In the second application of the flexing element, the device is made higher, may have multiplicity of convolutions and is employed so as to make use of the extended height or convolutions to permit horizontal flexure.

Because this latter flexing element must bear a vastly greater net stress, it is typically made more robustly than the diaphragm element. It has the virtue of allowing horizontal flexure within the structure of the element itself. However, the element may be subject to excessive sway unless constrained. Sway conditions may be compounded as the element is inflated further, or if it travels to its upper range.

BRIEF SUMMARY OF THE INVENTION

Vibration is naturally present in any building and this vibration in some form is transmitted through the building and through articles in the building, such as tables, benches, etc. The vibration exerts forces on articles in a building and vertical and horizontal (translational) forces tend to combine to create complex motions in the article. That is, motion in any single mode in the buidling may rather quickly produce other modes of motion within the article. In a building an article such as a table undergoes a complex swaying and twisting motion due to its height and elevated center of mass regardless of the direction of the original exciting forces. The flexing elements described above effectively dampen and attenuate those forces acting normal to a horizontal plane.

My invention embodies a pressurized pneumatic piston which both attenuates and dampens vertical and horizontal forces and combinations of the same caused by vibration.

My invention broadly comprises a pressurized, gastight chamber, a first elongated member passing through one of the chamber walls and extending into and out of the chamber. Means to secure flexibly the first elongated member within defined vertical limits in a seal-tight manner to the chamber are provided. The first member moves with reference to the chamber in a region of vertical rolling. A second elongated load-bearing member is received within the first member and is supported by the first member in a pivotal manner below the region of vertical rolling. The upper end of the second member includes a support surface. The first and second members are adapted for relative movement one to the other.

The invention described and claimed herein in a preferred embodiment, which incorporates means of horizontal flexure, is a development of the diaphragm principle. The applied load is imparted to the first member which is a central moving load-bearing piston having a gas-tight extension. The second member directly supports the load and is secured in the extension. Load forces are imparted to the piston, at a point well below the region of vertical rolling of the diaphragm, thus assuring an inherent stability.

The gas-tight extension in one embodiment includes a piston well with a simple support plane and means of centrally locating the second load-supporting member so as to form a flexible coupling. In an alternative embodiment, the extension includes a secondary diaphragm and piston assembly served by the same gas pressure bearing the first diaphragm and piston. In this instance, the load-supporting member couples rigidly to the secondary piston.

The principle of the invention embodying the vibration isolation system permits horizontally directed forces to activate the load-bearing piston in a gimbal-like fashion. The piston and diaphragm flexure respond to horizontal input by translating it into a vertical motion: one side of the piston up, the other down in a rolling, gimbal-like motion for which the highly flexible diaphragm system is expressly well suited. The piston is limited against damaging over-travel in the vertical direction, and this limiting also prevents the lower flexible coupling from ever rising above the roll center of the diaphragm and becoming unstably situated.

It should be noted that the effect of the rolling 'gimbal' motion of the diaphragm is not simply that of a pendulum. Prior art in the practice of vibration isolation techniques had often made use of a mechanical pendulum suspension for permitting horizontal flexure in the overall suspension system. Observation of the characteristic motion of the gimbal piston has shown that its performance produces a far lower resonance frequency than would a simple pendulum of the same length.

DESCRIPTION OF THE PREFERRED EMBODIMENT

Figure 1:
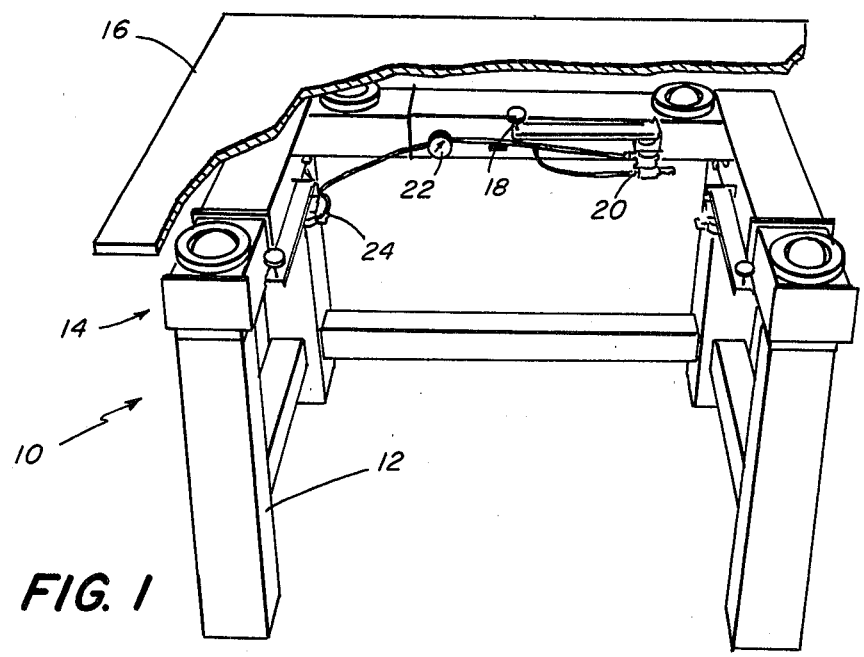
FIG. 1 is a perspective view of a vibration-free air isolated table embodying the invention.

In FIG. 1, a vibration-free isolation table 10 is shown which comprises legs 12, an air isolation system 14 and a top surface 16 illustrated perspectively.

The system 14 includes three valve adjustment pads 18, servo-valves 20, a table air gauge 22, an air inlet 24 and four load carrying pneumatic piston assemblies 30. One piston assembly 30 is shown in detail in FIG. 2.

Figure 2:
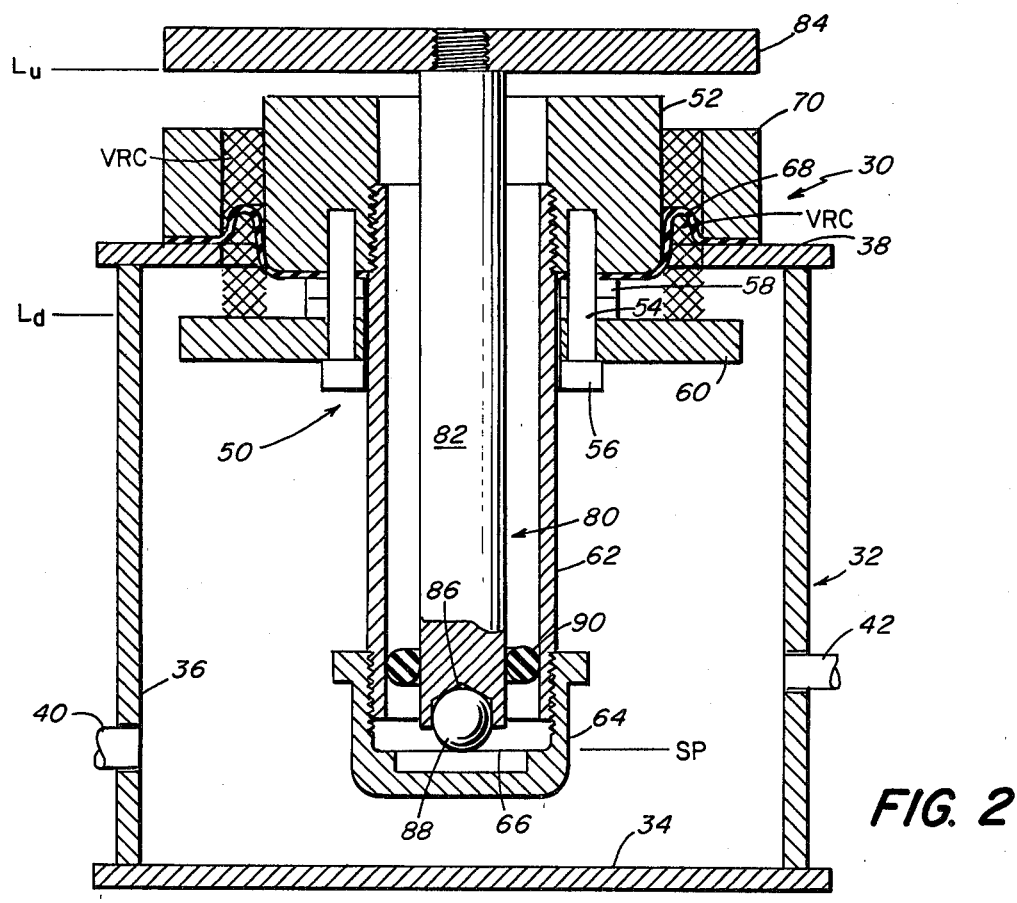
FIG. 2 is a front sectional view of an assembly of the preferred embodiment; and, FIG. 3 is a front sectional view of an alternative embodiment of the invention.

Referring to FIG. 2, the assembly 30 comprises a load carrying chamber 32, having a floor 34, four walls 36 and an inwardly extending annular plate 38 which is rigidly secured to the table. A fitting 40 connects to a pressure line (not shown) for the introduction of pressurized air into the chamber. A fitting 42 connects to a pressure hose having a orifice which communicates with a pressurized damping chamber (not shown).

A first elongated member 50 is received in the chamber 32. This member 50 comprises a piston 52 having a depending shirt 54 including a flared end 56. Interposed between the piston and the end 56 are spatial rings 58 and a motion-limiting disk 60. A piston well 62 threaded at both ends is joined in a seal-tight manner at its upper end to the inner surface of the piston 52. Joined in a seal-tight manner to the lower end of the well 62 is a cap 64 with an upwardly facing bearing plate 66.

The member 50 is secured to the chamber 30 in a flexible seal-tight manner. An annular diaphragm 68 is secured between the rings 58 and piston 52 and to the plate 38 by a clamping ring 70.

The member 50 is pneumatically supported in the pressurized chamber 32. The upward vertical movement $L_u$ of the member is controlled by the motion-limiting disk 60. The downward vertical movement $L_d$ of the member is controlled by the plate 84 engaging the blocks 70.

Pivotally received in the well 62 is a second elongated member or load-supporting member 80 which comprises a support rod 82 having an upper end on which is received the support plate 84 and a lower end characterized by a recess 86. Secured in the recess 86 is a ball bearing 88 engaged to the bearing plate 66. A horizontal support plane passes through this point of engagement SP. A flexible O-ring 90 maintains or biases the member 80 to alignment with the piston well. That is, under ideal static conditions, the longitudinal axes of the first and second members are coincident.

The vertical roll center (VRC) is identified in FIG. 2. The region of vertical roll is shaded. Where the ball bearing contacts the bearing plate, that is, where the load forces are carried, is at a point well below the region of vertical rolling of the diaphragm.

In determining the effectiveness of the present invention, tests were conducted by applying vibrational forces to a vibration isolation table such as 10. In the example, a MICRO-g isolation table, Model No. 2536-S16-4-30F, having a top plate of approximately 24"×34", dimensioned to provide a load of 450 lbs. was used. The only change from the standard models as sold was that the pneumatic pistons used were those as described for the present invention. The communication with the damping chamber was the same as on the commercially available model and the pressure in both chambers at equilibrium was 60 lbs. per square inch gauge. Vertical oscillations acting on the loading chamber (32 of FIG. 2) of 5 and 10 Hz were attenuated more than 90% oscillations of 5 and 10 Hz in the horizontal direction were also attenuated more than 90%. Measurements were made with a seismometer. With the prior art devices, horizontal forces (oscillations) are essentially not attenuated.

Figure 3:
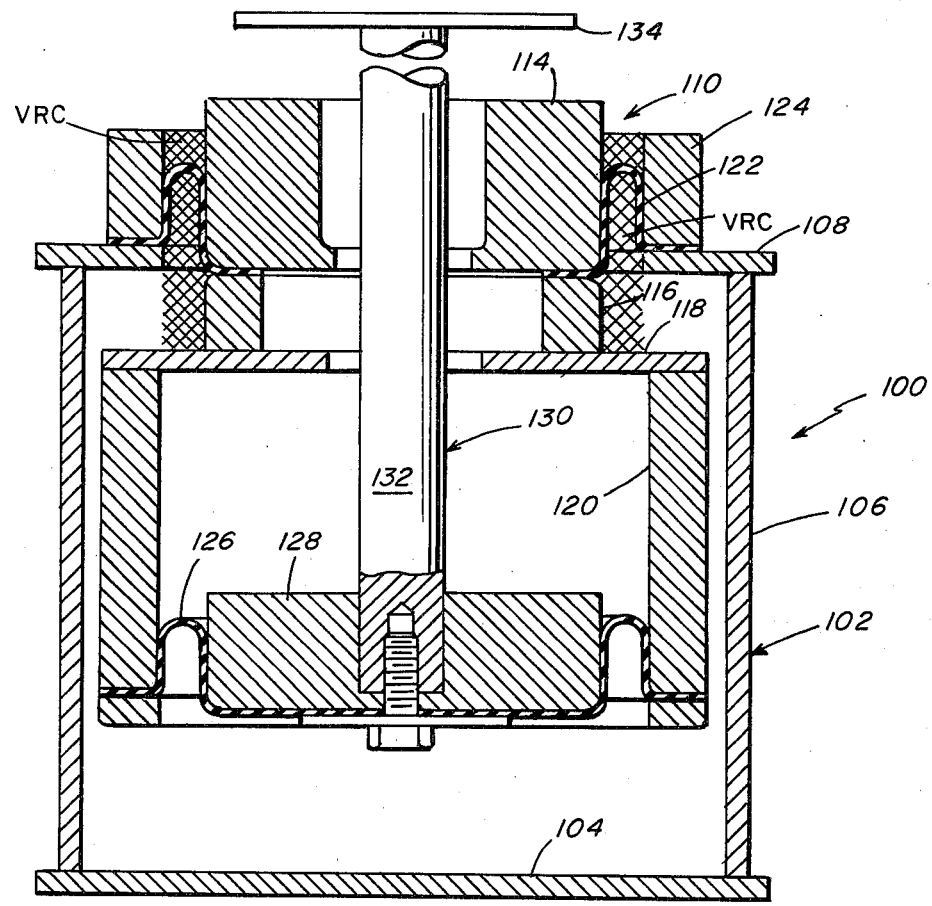

An alternative embodiment of the invention is shown in FIG. 3. An assembly 100 comprises a chamber 102, a floor 104 and walls 106. The pressure line inlet port and the connection to the damping chamber are not shown. An annular top support plate 108 rigidly secured to the table is joined to the walls 106.

A first elongated member 110 comprises a primary piston 114 and a depending skirt 116. An annular plate 118 joins a cylindrical wall 102 to the skirt 116. An annular diaphragm 122 is secured to the element 114 and to the plate 108 by an annular clamping ring 124.

A disk-shaped diaphragm 126 is clamped to the depending end of the wall 120 and supports a secondary piston 128.

A second member or load-support member 130 comprises a column 132 having upper and lower ends. The lower end of the column is secured to the piston 128 and the upper end of the column is joined to a support plate 134. The vertical roll center and the region of vertical roll are identified as in FIG. 2.

Although described with reference to a preferred and an alternative embodiment, other modificatios to the disclosed embodiments within the skill of the art are considered within the scope of the invention.

Having described my invention, what I now claim is:

1. In an air isolation system wherein a horizontal surface is isolated from vibrational forces by being supported by pneumatic piston assemblies which assemblies each have a loading chamber and a damping chamber, the chambers being pressurized, the improvement of the pneumatic piston assembly comprising:
   (a) a loading chamber;
   (b) an annular piston flexibly received in the chamber in a pressure-tight manner, said piston including a piston well which well includes an upwardly facing bearing surface in its depending end;

(c) an annular diaphragm to secure flexibly the piston in the chamber, the piston supported by the pressure in the chamber, the chamber and the piston adapted for movement one relative to the other with reference to a vertical roll center in a region of vertical roll;

(d) an elongated load support member which passes through the piston and pivotally engages the bearing surface of the piston well below the region of vertical roll to allow relative pivotal movement between the piston and load support member, the upper end of the support member including a support plate to support a load to be isolated; and, (e) means to limit the vertical movement of the first and second members respectively between upper and lower limits of the region of vertical roll;

whereby forces acting on the chamber will be substantially absorbed by the first member which will move relative to the position of the second member thereby isolating the second member and the supported load from said forces.

2. The piston assembly of claim 1 wherein the piston has a skirt-like extension which includes a motion-limiting disk secured thereto to define the upper vertical limit, which limiting disk extends beyond the outer periphery of the piston and engages the chamber wall when the piston moves upwardly.

3. The piston assembly of claim 1 wherein the support plate of the load support member is spaced-apart from the chamber wall to define the lower vertical limit and engages the chamber wall when the piston moves downwardly.

4. The piston assembly of claim 1 which includes means to resiliently support the load support member within the piston, said means biasing the second member to a position wherein the longitudinal axes of the load support member and piston are coincident.

5. The piston assembly of claims 2, 3 or 4 wherein the skirt-like extension includes a bearing surface, the depending end of the second member includes a ball bearing secured thereto which bearing engages said bearing surface.

6. The piston assembly of claim 1 wherein the means to secure the secondary piston to the cylindrical wall includes a flexible diaphragm.

7. The piston assembly of claim 1 wherein the means to secure the first member to the chamber is an annular diaphragm.

8. In an air isolation system wherein a horizontal surface is isolated from vibrational forces by being supported by pneumatic piston assemblies, which assemblies each have a loading chamber and a damping chamber, the chambers being pressurized and the improvement of the pneumatic piston assembly comprising:

(a) a loading chamber;

(b) a primary piston having a depending cylindrical wall secured thereto, said primary piston flexibly received in the chamber in a pressure-tight manner;

(c) a secondary piston flexibly joined to the depending end of the cylindrical wall;

(d) means to secure flexibly the primary piston in the chamber, the primary piston supported by the pressure in the chamber, the chamber and the primary piston adapted for movement one relative to the other with reference to a vertical roll center in a region of vertical roll;

(e) an elongated load support member which passes through the primary piston and engages the secondary piston below the region of vertical roll to allow relative pivotal movement between the primary piston and the elongated load support member;

(e) means to limit the vertical movement of the first and second members respectively between upper and lower limits of the region of vertical roll whereby forces acting on the chamber will be substantially absorbed by the primary piston which will move relative to the position of the load support member thereby isolating the load support member and the supported load from said forces.

* * * * *